US008104547B2

(12) United States Patent
Kunz et al.

(10) Patent No.: US 8,104,547 B2
(45) Date of Patent: Jan. 31, 2012

(54) RESILIENT STOP ASSEMBLY FOR IMPACT TOOL

(75) Inventors: Michael Kunz, Dorndorf (DE); Stefan D. Gensmann, Fruecht (DE); Markus Rompel, Runkel/Schadeck (DE); Andreas Syma, Koeln (DE)

(73) Assignee: Black & Decker Inc., Newark, DE (US)

( * ) Notice: Subject to any disclaimer, the term of this patent is extended or adjusted under 35 U.S.C. 154(b) by 61 days.

(21) Appl. No.: 12/481,043

(22) Filed: Jun. 9, 2009

(65) Prior Publication Data

US 2010/0000752 A1 Jan. 7, 2010

(30) Foreign Application Priority Data

Jun. 11, 2008 (GB) .................................. 0810678.3

(51) Int. Cl.

| | |
|---|---|
| ***B25D 17/11*** | (2006.01) |
| ***B25D 17/24*** | (2006.01) |
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |

(52) U.S. Cl. ..................................... 173/210; 173/162.1

(58) Field of Classification Search .......... 173/210–212; 267/136–141.7, 153; 248/632–636

See application file for complete search history.

(56) References Cited

U.S. PATENT DOCUMENTS

| | | | | | |
|---|---|---|---|---|---|
| 1,679,698 | A | * | 8/1928 | Weydert | 267/64.25 |
| 2,184,482 | A | * | 12/1939 | Austin et al. | 428/139 |
| 2,641,463 | A | * | 6/1953 | Mulcahy | 267/201 |
| 3,086,765 | A | * | 4/1963 | Zanow | 267/141.1 |
| 3,126,630 | A | | 3/1964 | Catlin et al. | |
| 3,434,708 | A | * | 3/1969 | Hawk, Jr. | 267/293 |
| 3,504,901 | A | * | 4/1970 | Ditty | 267/138 |
| 3,677,535 | A | * | 7/1972 | Beck | 267/294 |
| 3,684,271 | A | * | 8/1972 | Arthur | 267/152 |
| 3,845,827 | A | * | 11/1974 | Schulin | 173/162.1 |
| 3,997,151 | A | * | 12/1976 | Leingang | 267/152 |
| 4,278,726 | A | * | 7/1981 | Wieme | 428/300.7 |

(Continued)

FOREIGN PATENT DOCUMENTS

DE 3930592 A1 3/1989

(Continued)

OTHER PUBLICATIONS

Matzdorf, Udo—European Search Report—Oct. 12, 2009—The Hague.

*Primary Examiner* — Rinaldi Rada
*Assistant Examiner* — Robert Long
(74) *Attorney, Agent, or Firm* — Rhonda L. Barton; Scott B. Markow; Adan Ayala

(57) ABSTRACT

A resilient stop assembly for an impact tool includes first and second resiliently deformable parts, and a substantially rigid part situated between the deformable parts. Each of the first and second resiliently deformable parts and the substantially rigid part comprises: first and second opposite impact surfaces, at least one peripheral surface joining the impact surfaces, and an aperture extending entirely through the part between exit openings in the impact surfaces. The first impact surface of the second resiliently deformable part is separated from the second impact surface of the first resiliently deformable part by contact of those first and second impact surfaces with the substantially rigid part.

11 Claims, 14 Drawing Sheets

U.S. PATENT DOCUMENTS 4,348,015 A * 9/1982 Domer ........................ 267/140.4
4,415,146 A * 11/1983 Sitko ............................... 267/96
4,433,834 A * 2/1984 Jwuc .......................... 267/141.1
4,667,749 A * 5/1987 Keller ........................ 173/162.2
4,800,965 A * 1/1989 Keller ........................ 173/162.2
4,861,007 A * 8/1989 Morini .......................... 267/153
5,052,665 A * 10/1991 Sakuragi ....................... 267/220
5,407,018 A * 4/1995 Henry ........................... 173/211
5,460,357 A * 10/1995 Stewart ......................... 267/294
5,485,887 A * 1/1996 Mandanis ....................... 173/17
5,553,764 A * 9/1996 Remerowski ................... 227/10
5,617,925 A * 4/1997 Boothby et al. .............. 173/211
5,691,037 A * 11/1997 McCutcheon et al. ........ 428/172
6,059,163 A * 5/2000 Pfister et al. ..................... 227/10
6,364,294 B1 * 4/2002 Gennesseaux et al. .. 267/140.13
6,382,603 B1 * 5/2002 Monson et al. ................. 267/80
7,083,165 B2 * 8/2006 Palinkas ......................... 267/294
7,819,624 B2 * 10/2010 Bonnet ......................... 415/119
2002/0020950 A1 * 2/2002 Bouhier et al. .......... 267/140.13
2005/0284649 A1 * 12/2005 Sabates et al. ................ 173/212
2009/0188692 A1 * 7/2009 Hahn et al. .................... 173/210

FOREIGN PATENT DOCUMENTS

EP 0732178 A1 9/1996

* cited by examiner

RESILIENT STOP ASSEMBLY FOR IMPACT TOOL

BACKGROUND OF THE INVENTION

1. Field of the Invention

The present invention relates to impact tools, for example fastener driving tools and hammer tools (e.g. rotary hammer tools or hammer drills). The invention is particularly relevant to fastener driving impact tools in which the fasteners include nails (i.e. nailers), but the invention also concerns other types of impact tools, and impact tools for other types of fasteners, including pins, staples, etc.

2. Description of the Related Art

Many impact tools include a driver that is propelled rapidly against a fastener to drive a fastener from the tool into a workpiece. The driver may comprise a piston, or a ram (impact member), for example. The driver may be propelled in any of a variety of ways, including (but not limited to) pneumatically, by combustion, by means of a strap or chain, by means of a separate piston, or by means of one or more flywheels, for example. However, whatever the manner of propelling the piston, the tool will normally need to include a resilient end stop—often termed a "bumper" or "buffer"—to halt the forward motion of the driver once the fastener has been driven from the tool. In some tools, the resilient end stop may be utilized every time the driver drives a fastener, and in other tools the resilient end stop may be provided as a back-up that is used only in the event of a failure of another component of the tool.

U.S. Pat. No. 4,042,036 discloses an electric impact tool having a pair of motor-driven counter-rotating flywheels arranged to propel a ram into engagement with a fastener to drive the fastener from the tool. A nose piece of the tool includes an energy-absorbing monolithic cushion to receive and absorb some of the excess kinetic energy of the ram as it nears completion of its work stroke.

U.S. Pat. No. 3,403,600 discloses a pneumatic fastening machine operated by compressed air controlled by a trigger actuated valve. The machine includes a piston axially movable in a cylinder, and the upper end of a driving member is fixed to the piston, with the remainder of the driving member extending downwardly from the piston. A valve member formed of resilient material, and having an opening, receives the drive member in the opening. An elastic sealing ring is disposed between a peripheral surface of the valve member and the inner surface of the cylinder. The valve member has an inclined peripheral surface carrying a metal ring, to press the sealing ring into engagement with a fixed member at the bottom of the cylinder. This action causes the elastic ring to expand and to be pressed against the inner surface of the cylinder when the piston moves the valve member axially downwardly at the end of the driving stroke.

BRIEF SUMMARY OF THE INVENTION

The present invention seeks to provide an improved resilient stop assembly for an impact tool.

A first aspect of the present invention provides a resilient stop assembly for an impact tool, including first and second resiliently deformable parts, and a substantially rigid part situated, at least in use, between the deformable parts, each part including: first and second opposite impact surfaces, at least one peripheral surface joining the impact surfaces, and an aperture extending entirely through the part between exit openings in the impact surfaces; wherein the first impact surface of the second resiliently deformable part is separated from the second impact surface of the first resiliently deformable part by contact of those first and second impact surfaces with the substantially rigid part.

Preferably, in use, the stop assembly is arranged in an impact tool such that when a driver of the tool contacts the stop assembly, the driver's direct contact with the stop assembly is with the first impact surface of the first resiliently deformable part. At least some of the kinetic energy of the driver is then absorbed by the first resiliently deformable part, but any residual kinetic energy is transferred from the first resiliently deformable part to the substantially rigid part, via the second impact surface of the first resiliently deform able part and the first impact surface of the substantially rigid part. The substantially rigid part then transfers most or substantially all of the kinetic energy to the second resiliently deformable part, via the second impact surface of the substantially rigid part and the first impact surface of the second resiliently deformable part. The second resiliently deformable part then preferably absorbs most or all of the remaining kinetic energy. Preferably the second impact surface of the second resiliently deformable part contacts a surface, preferably a substantially rigid surface, of a housing part or frame part of the tool.

Because the first impact surface of the second resiliently deformable part is separated from the second impact surface of the first resiliently deformable part by contact of those surfaces with the substantially rigid part, substantially any kinetic energy of the driver that is not absorbed by the first resiliently deformable part is transmitted to the second resiliently deformable part via the substantially rigid part. The invention thus has the advantage that, by including first and second resiliently deformable parts separated by a substantially rigid part, the resilient stop assembly can absorb at least some of the kinetic energy of the driver in stages, preferably via the impact surfaces of the various parts, with some of the energy absorbed by the first resiliently deformable part, and some of the energy absorbed by the second resiliently deformable part. Further, this structure and arrangement of the assembly enables the first and second resiliently deformable parts to have different shapes and/or hardnesses and/or elasticities for example, thus providing the possibility of tailored mechanical and/or materials benefits, to provide a highly effective resilient stop assembly.

In preferred embodiments of the invention, each part of the resilient stop assembly includes an undivided unitary body. That is, preferably each of the first and second resiliently deformable parts, and the substantially rigid part, includes a single piece. However, in some embodiments of the invention it may be advantageous for one or more of the parts to include a plurality of separate pieces which, in use, collectively form the part. In such embodiments of the invention, for a part including a plurality of separate pieces, the aperture extending through the part may, for example, extend between at least two such pieces.

A second aspect of the invention provides a resilient stop assembly for an impact tool, including first and second resiliently deformable parts, and a substantially rigid part situated, at least in use, between the deformable parts, wherein the first and second resiliently deformable parts have different hardnesses and/or elasticities.

A third aspect of the invention provides an impact tool including a resilient stop assembly according to the first and/or second aspect of the invention.

The impact tool may be a fastener driving tool (e.g. a nailer) or a hammer (e.g. a hammer drill), for example. The impact tool preferably is a fastener driving tool that includes a driver arranged to drive fasteners from the tool, the resilient stop assembly being arranged to provide a resilient stop for the driver.

Any feature of any aspect of the invention may be a feature of any other aspect of the invention.

Preferably, the driver has a front surface arranged to contact the resilient stop assembly, in use. In preferred embodiments of the invention, the second impact surface of the substantially rigid part is in contact with first impact surface of the second resiliently deformable part, and the second impact surface of the substantially rigid part preferably has a greater area than does the first impact surface of the first resiliently deformable part. Advantageously, the second impact surface of the substantially rigid part may be at least as large in area as the front surface of the driver, and more preferably, the second impact surface of the substantially rigid part is greater in area than the front surface of the driver. This has the advantage that the substantially rigid part of the stop assembly may spread out (i.e. widen, or disperse) the force imparted by the driver on the stop assembly. Thus, the substantially rigid part may effectively increase the surface area of the front surface of the driver (as far as the force experienced by the second resiliently deformable part is concerned), thereby reducing the pressure applied to the second resiliently deformable part. This may therefore enable the second resiliently deformable part to absorb a greater amount of kinetic energy than would have been the case without the substantially rigid part. This in turn may avoid the need for the front surface of the driver to be large merely so that the pressure it applies to the resilient stop is not too great. Consequently, this can provide greater design freedom for the driver, enabling the shape of the driver to be optimized for its propulsion and/or for the driving of fasteners, rather than for its shape to be compromised by the requirements of the resilient stop.

Preferably, the first and/or second impact surface(s) of the substantially rigid part is/are greater in area than the first and/or second impact surface(s) of the first resiliently deformable part. Advantageously, the first and/or second impact surface(s) of the second resiliently deformable part may be greater in area than the first and/or second impact surface(s) of the first resiliently deformable part. Preferably, the second impact surface of the second resiliently deformable part is greater in area than the first impact surface of the second resiliently deformable part.

In preferred embodiments of the invention, a thickness of the second resiliently deformable part between the first and second impact surfaces thereof is greater than a thickness of the first resiliently deformable part between the first and second impact surfaces thereof. Preferably, the second resiliently deformable part has a greater volume than does the first resiliently deformable part.

As already indicated, the first and second resiliently deformable parts may advantageously have different hardnesses and/or elasticities. Thus, at least a portion of the first resiliently deformable part may have a greater hardness and/or a lower elasticity than at least a portion of the second resiliently deformable part. For example, at least a portion of the first resiliently deformable part may have a Shore A hardness in the range 85 to 100, preferably approximately 90. Additionally or alternatively, at least a portion of the second resiliently deformable part may have a Shore A hardness in the range 70 to 84, preferably approximately 80.

As already indicated, in preferred embodiments of the invention, the first and second resiliently deformable parts have different shapes. Preferably, at least a portion of the peripheral surface(s) of the first and/or second resiliently deformable part(s) is curved. At least a portion of the peripheral surface(s) of the first and/or second resiliently deformable part(s) may flare outwardly, for example in a direction from the first impact surface to the second impact surface. Advantageously, the peripheral surface(s) of the first and/or second resiliently deformable part(s) may include(s) one or more openings and/or recesses.

At least a portion of the first and/or second resiliently deformable part(s) preferably is formed from an elastomeric material. For example, the elastomeric material may include a nitrile elastomer, preferably an acryl-nitrile-butadiene elastomer.

Preferably, the substantially rigid part is substantially in the form of a sheet, plate or disc, with its first and second impact surfaces forming major surfaces thereof. Advantageously, the first and/or second impact surface of the substantially rigid part may include at least one projection and/or recess arranged to cooperate with the resiliently deformable part in contact therewith, to hinder movement of that resiliently deformable part on that surface of the substantially rigid part. For example, the substantially rigid part may include one or more projections in the form of ridges. At least a portion of the substantially rigid part may, for example, be formed from metal, preferably steel.

Preferably, the resilient stop assembly is arranged to provide a resilient stop for the driver after the driver has driven a fastener in a forward direction relative to the remainder of the tool, and while the driver is moving in the forward direction. Thus, the resilient stop assembly may, for example, be disposed in a front region of the tool, behind an outlet nozzle through which fasteners are driven from the tool in use. As already indicated, the front surface of the driver preferably is arranged to contact the first impact surface of the first resiliently deformable part of the resilient stop assembly, in use. The driver preferably includes a ram part extending from the front surface of the driver, the ram part being arranged to extend through the apertures in the parts of the resilient stop assembly, to drive a fastener from the tool in use.

As already indicated, the impact tool according to the invention preferably is a nailer, the fasteners driven by the tool being nails.

BRIEF DESCRIPTION OF THE DRAWINGS

An embodiment of the invention will now be described, by way of example, with reference to the accompanying drawings, of which.

DETAILED DESCRIPTION OF THE INVENTION

Figure 1:
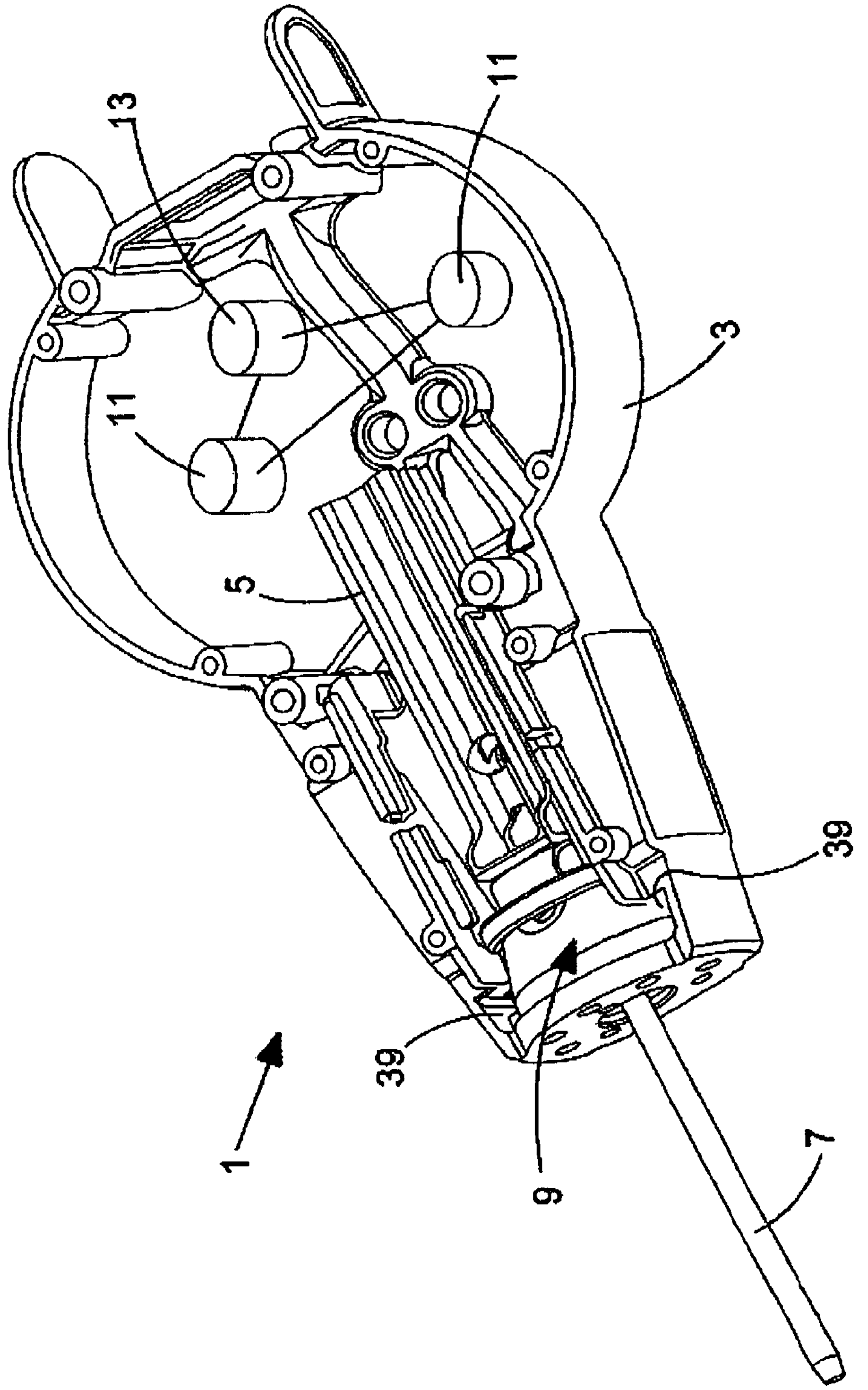
FIGS. 1 and 2 show an impact tool according to the invention, and components thereof.
Figure 2:
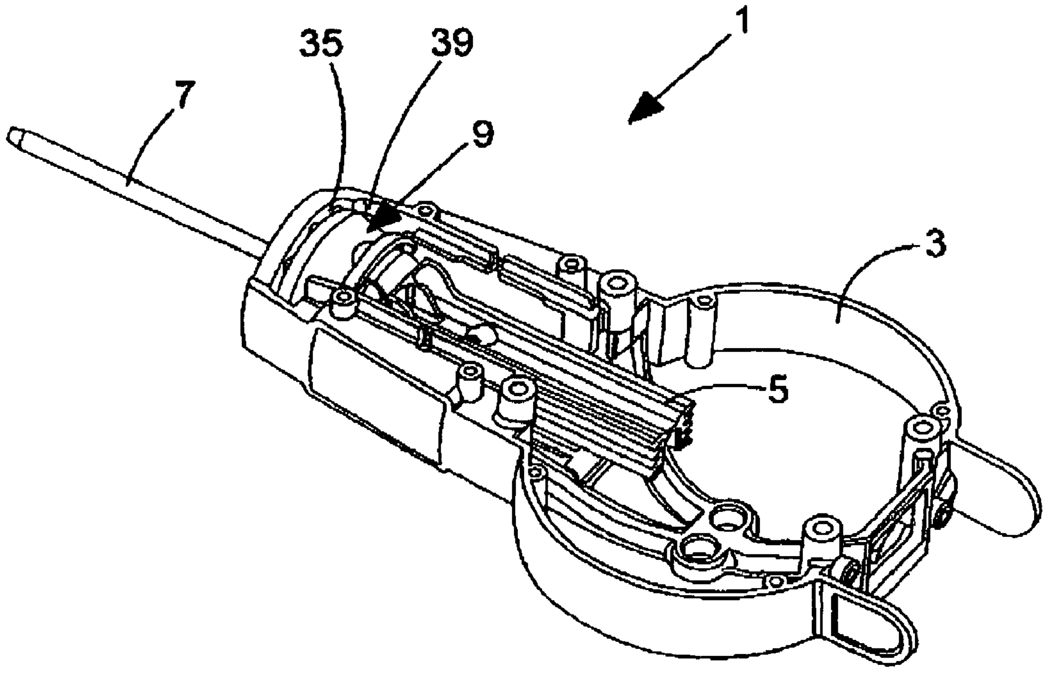

FIGS. 1 and 2 show an impact tool 1 according to the invention, and various components thereof, including a main body 3, a driver 5 including a ram part 7 (the ram being attached to a front part of the driver), and a resilient stop assembly 9 according to the invention, disposed in a front part of the main body 3. The impact tool 1 includes two flywheels 11 shown only schematically, arranged to be contacted by the driver 5 and to propel the driver and ram 7 forward, to drive a fastener (e.g. a nail) from the tool into a workpiece. The tool 1 also includes at least one electric motor 13, for powering the flywheels 11. Not shown, but provided in a conventional manner, the impact tool 1 includes a handle, a trigger for firing the tool, and a rechargeable (and removable) battery for powering the motor(s). The skilled person is familiar with impact tools having flywheel propelled drivers, for example as disclosed in U.S. Pat. No. 4,042,036, the entire disclosure of which is incorporated herein by reference. Consequently, the flywheels 11, motor(s) 13, and the manner of propulsion of the driver 5 will not be described in further detail herein.

Figure 3:
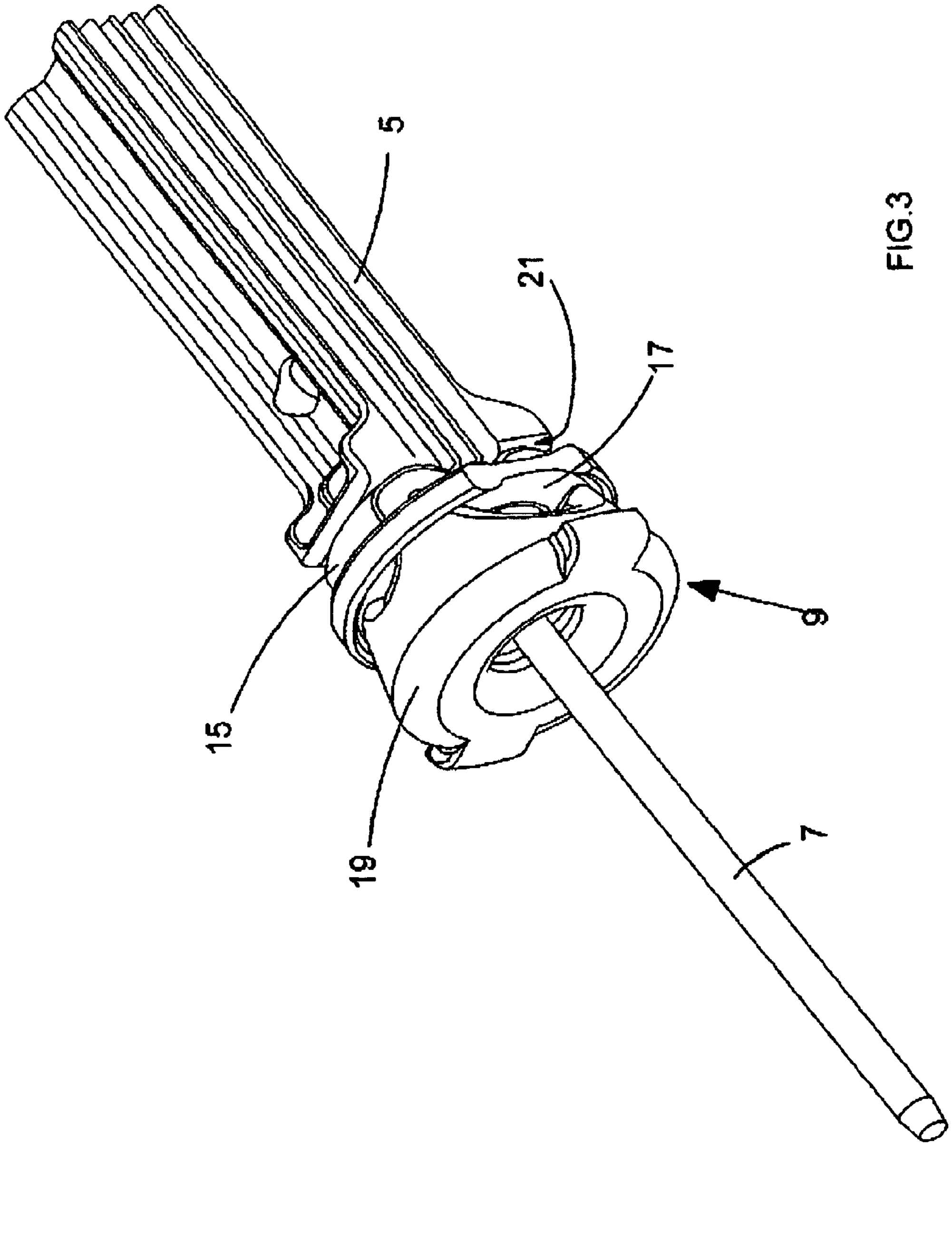
FIGS. 3 to 5 show a resilient stop assembly according to the invention, and a driver of an impact tool according to the invention.
Figure 4:
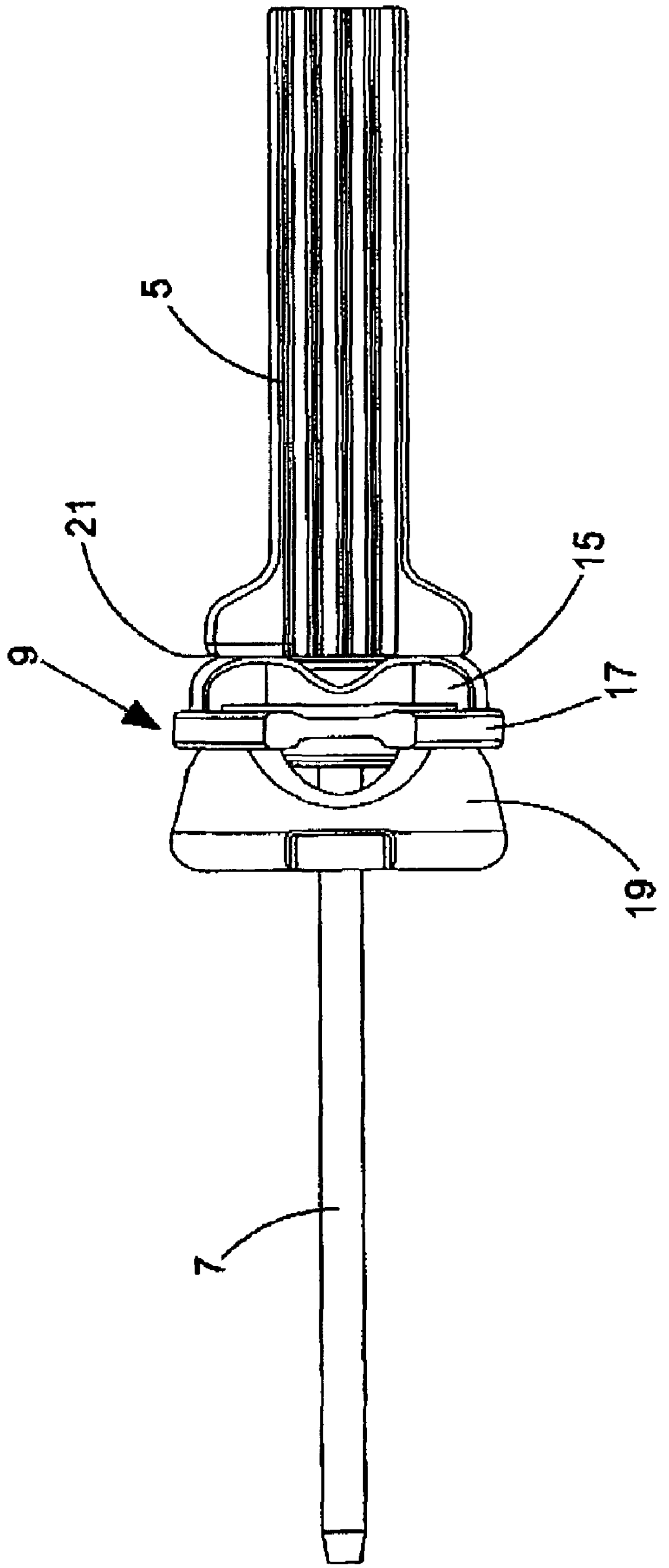
Figure 5:
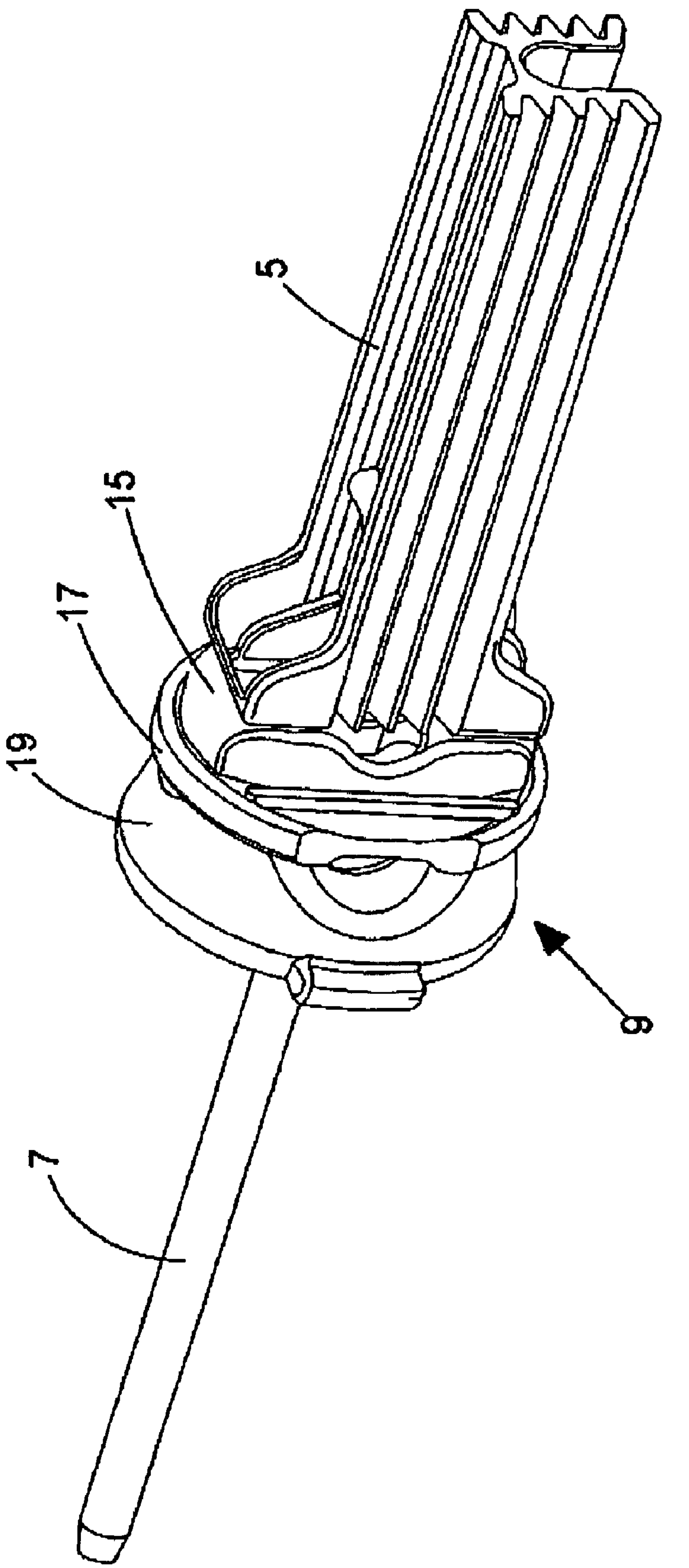
Figure 6:
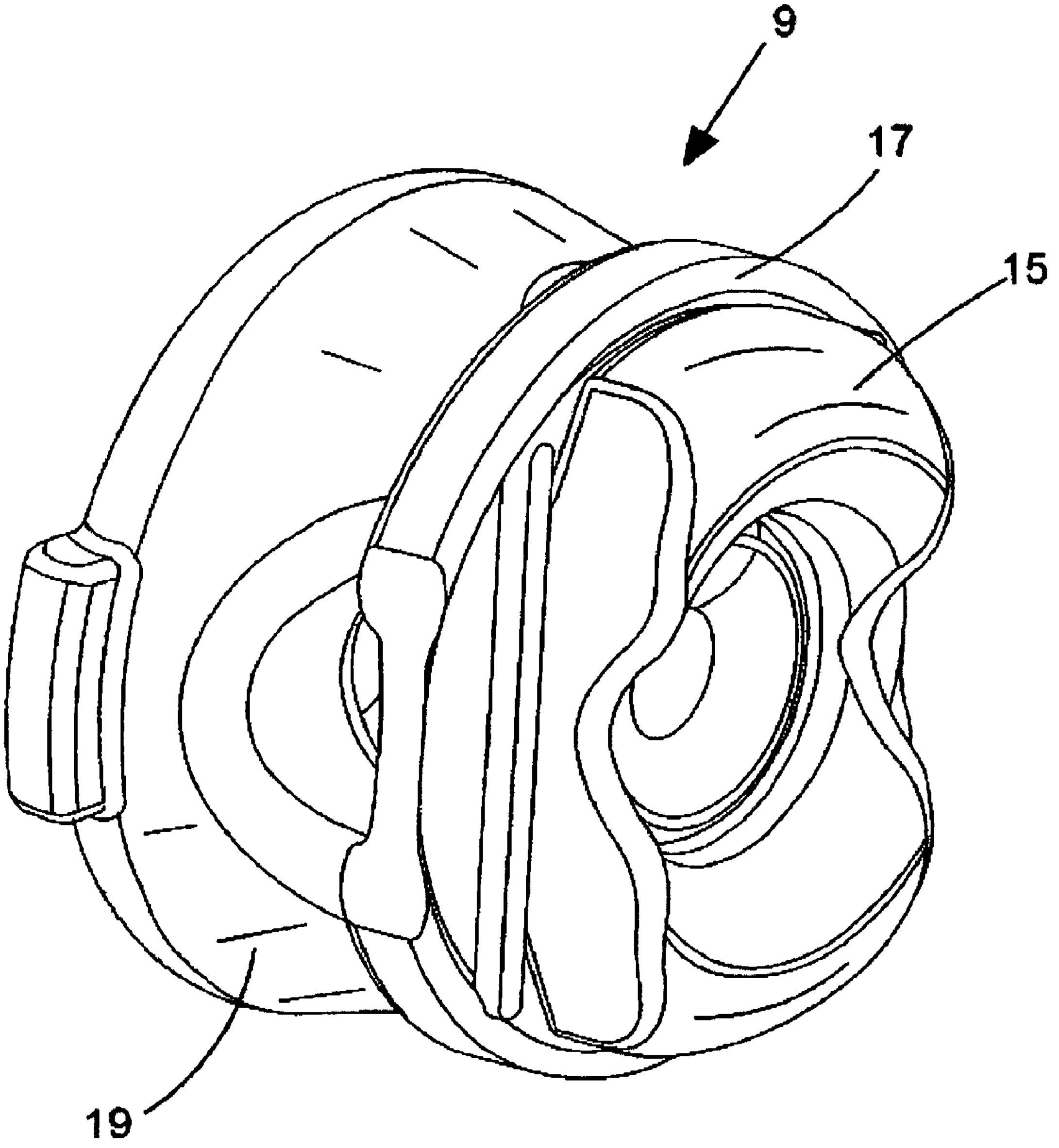
FIGS. 6 to 8 show a resilient stop assembly according to the invention.
Figure 7:
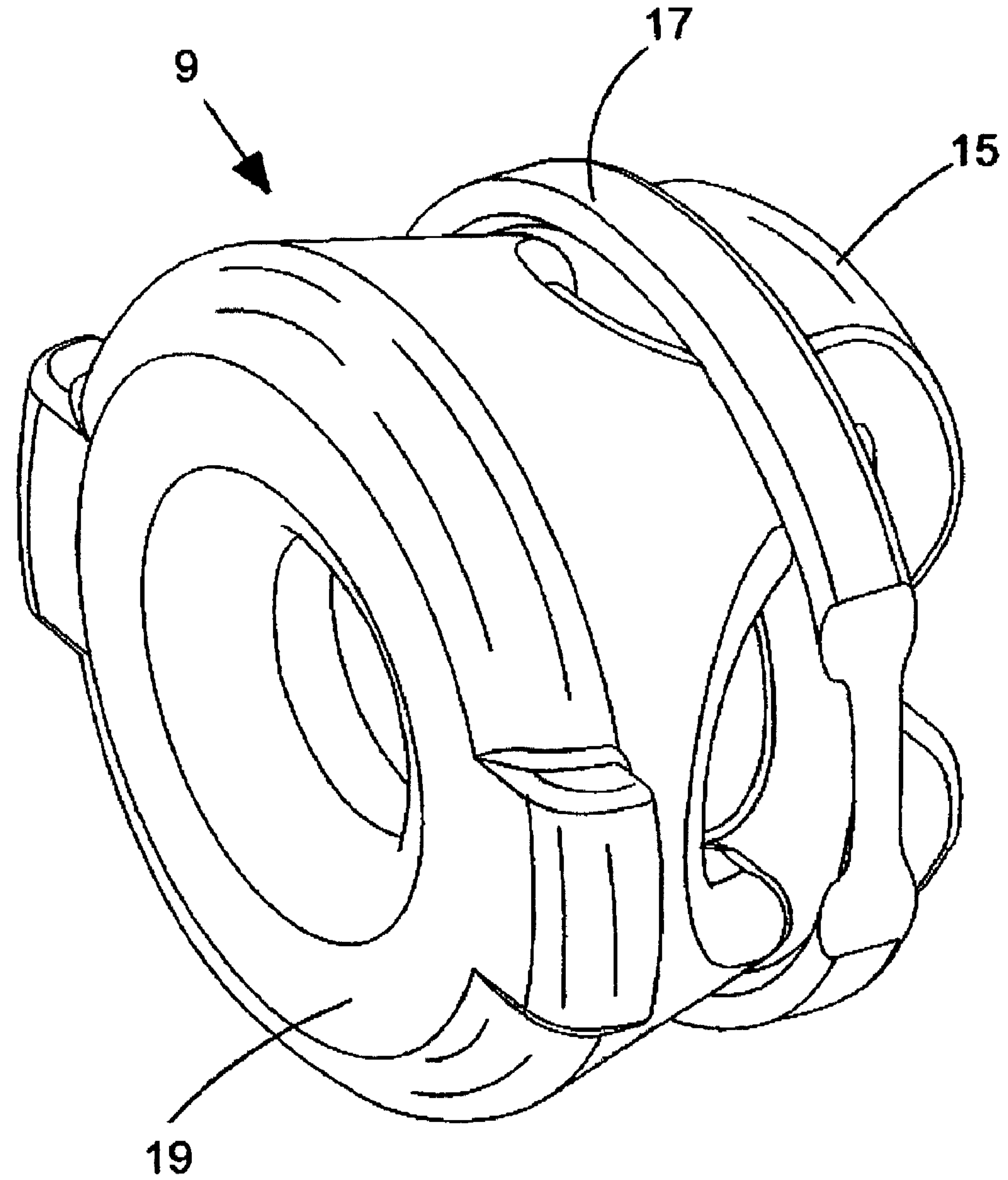
Figure 8:
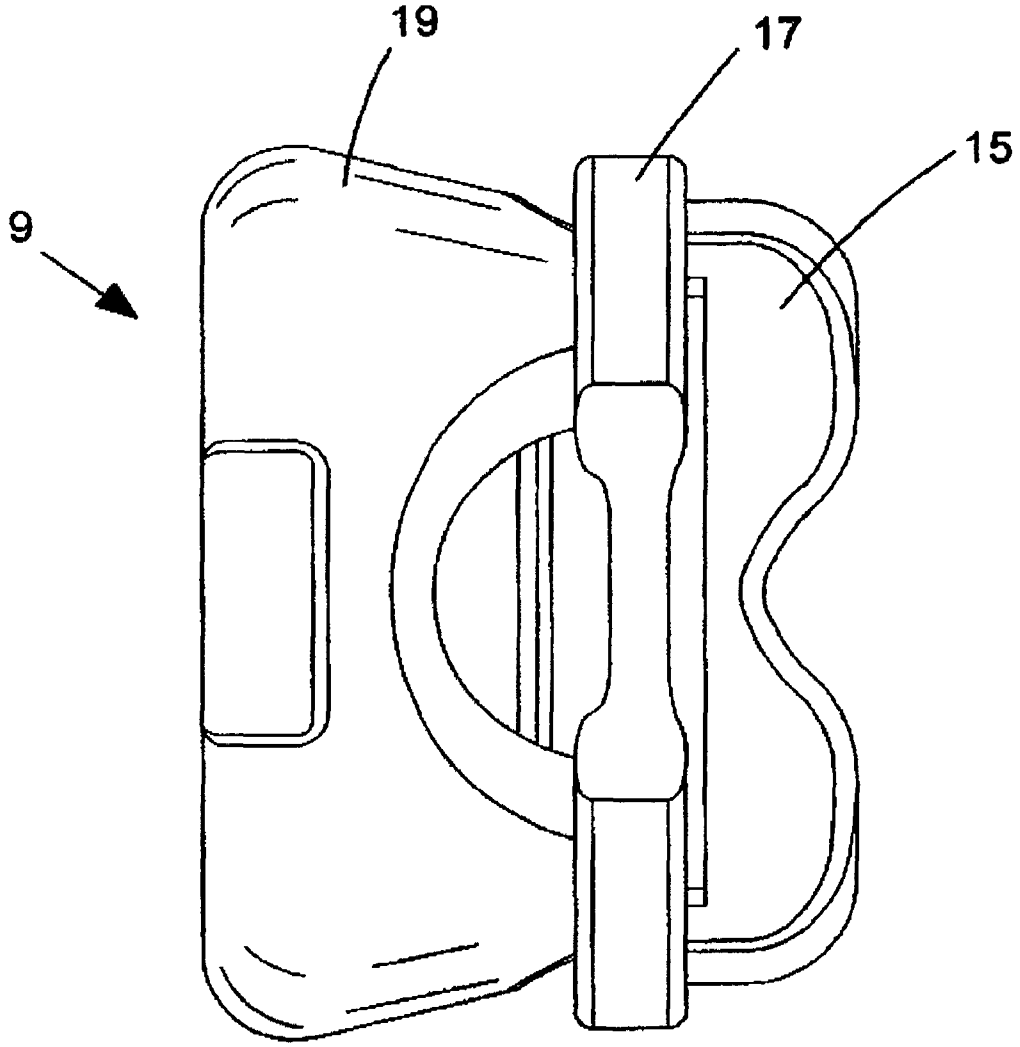
Figure 9:
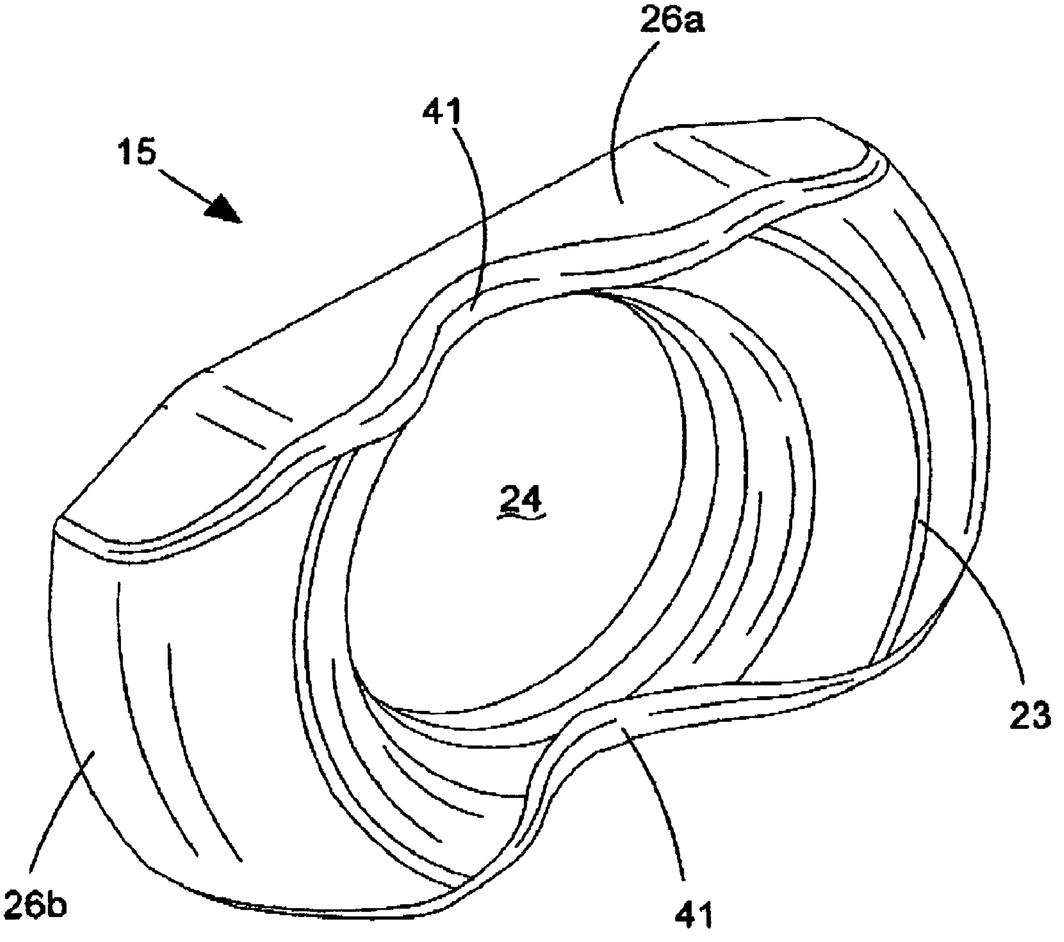
FIGS. 9 and 10 show a first resiliently deformable part of the stop assembly shown in FIGS. 6 to 8.
Figure 10:
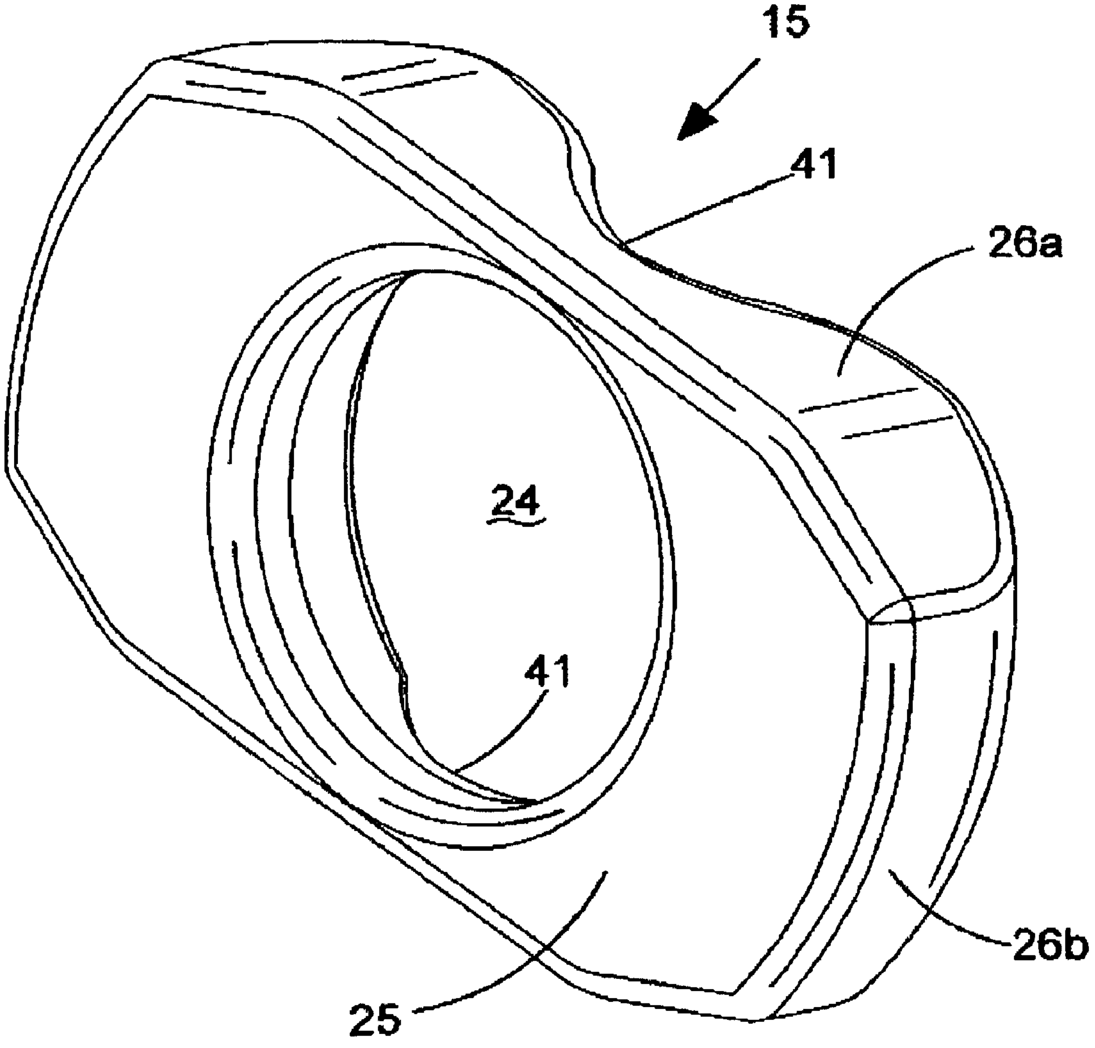
Figure 11:
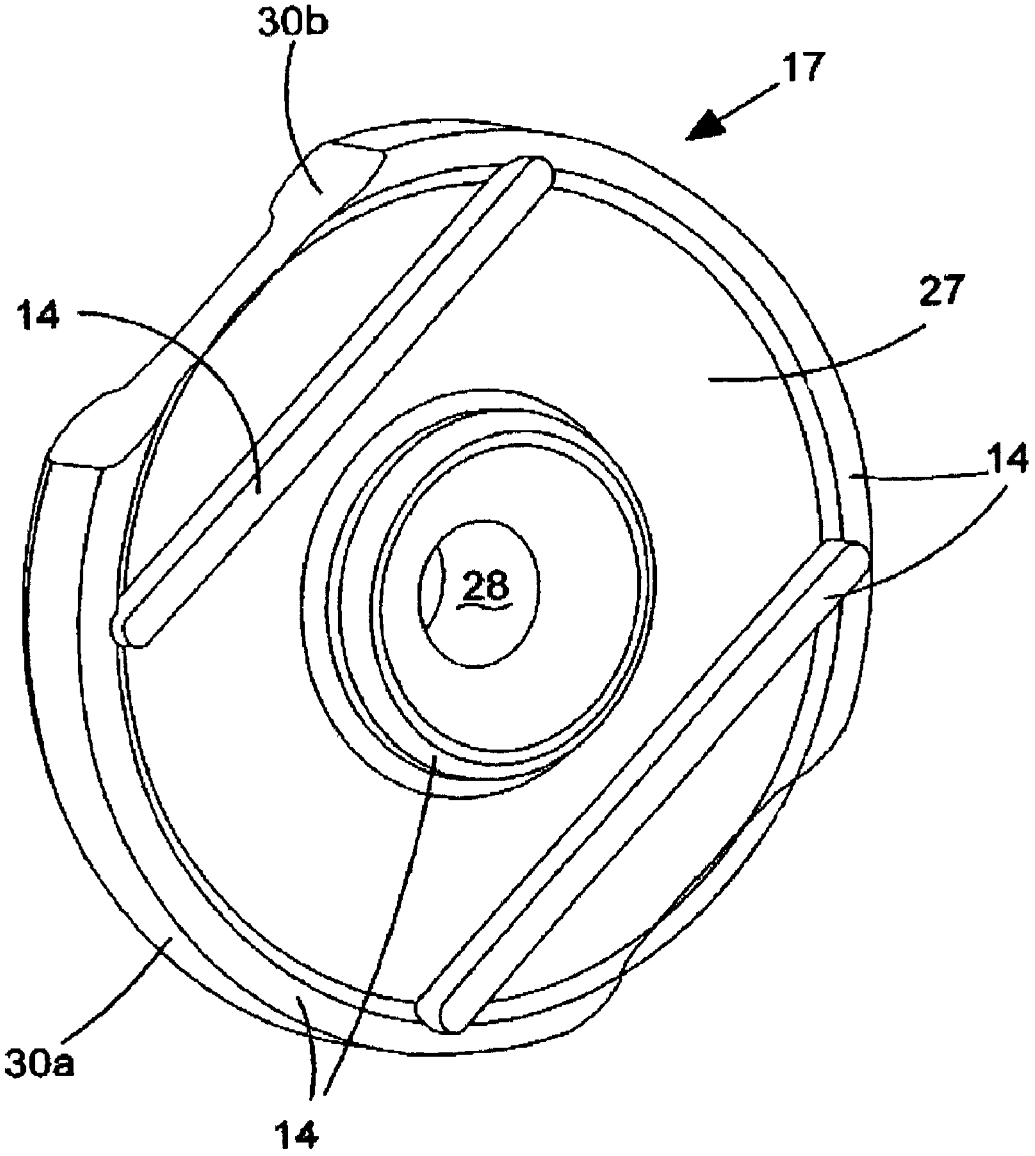
FIGS. 11 and 12 show a substantially rigid part of the stop assembly shown in FIGS. 6 to 8.
Figure 12:
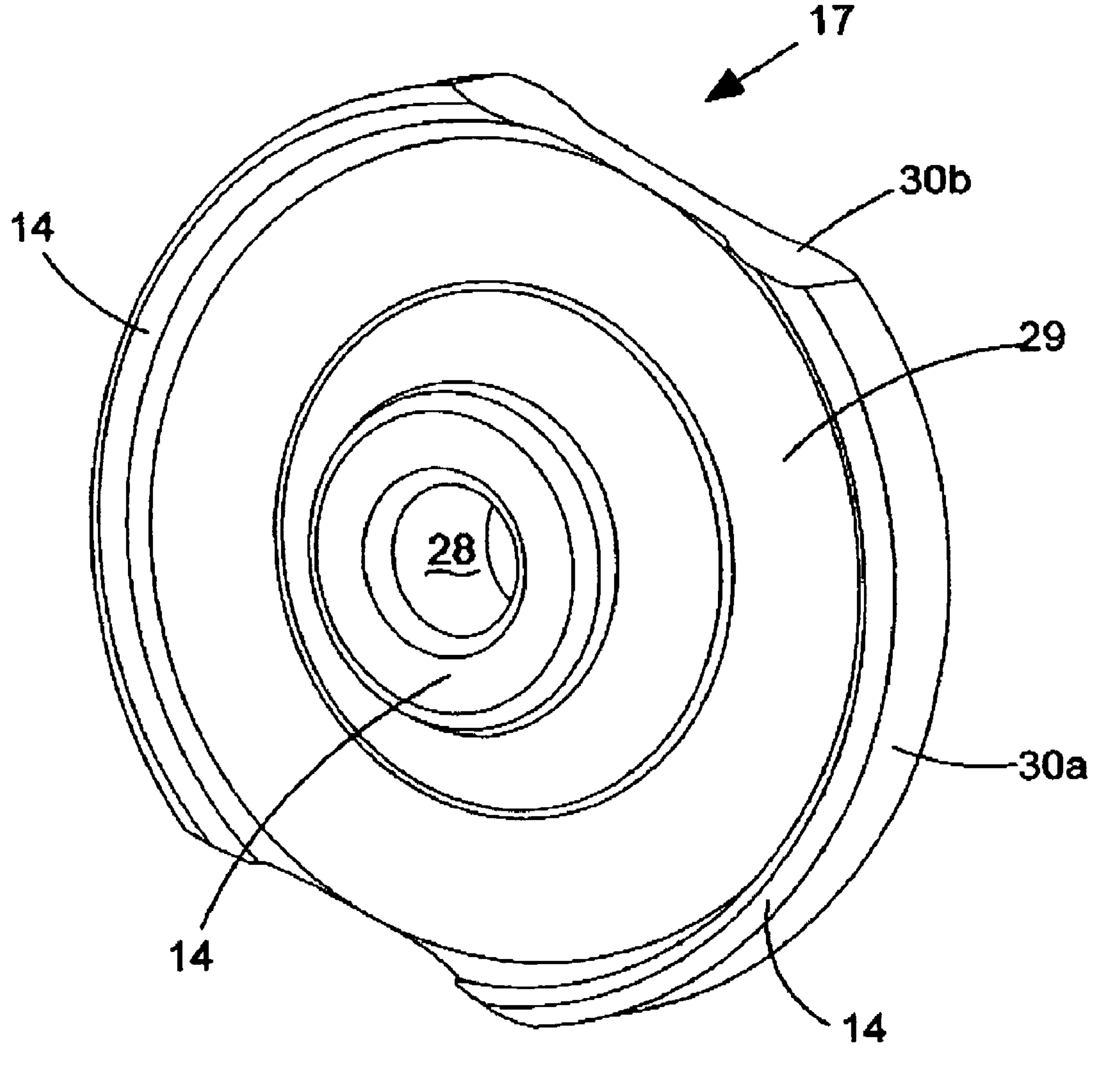
Figure 13:
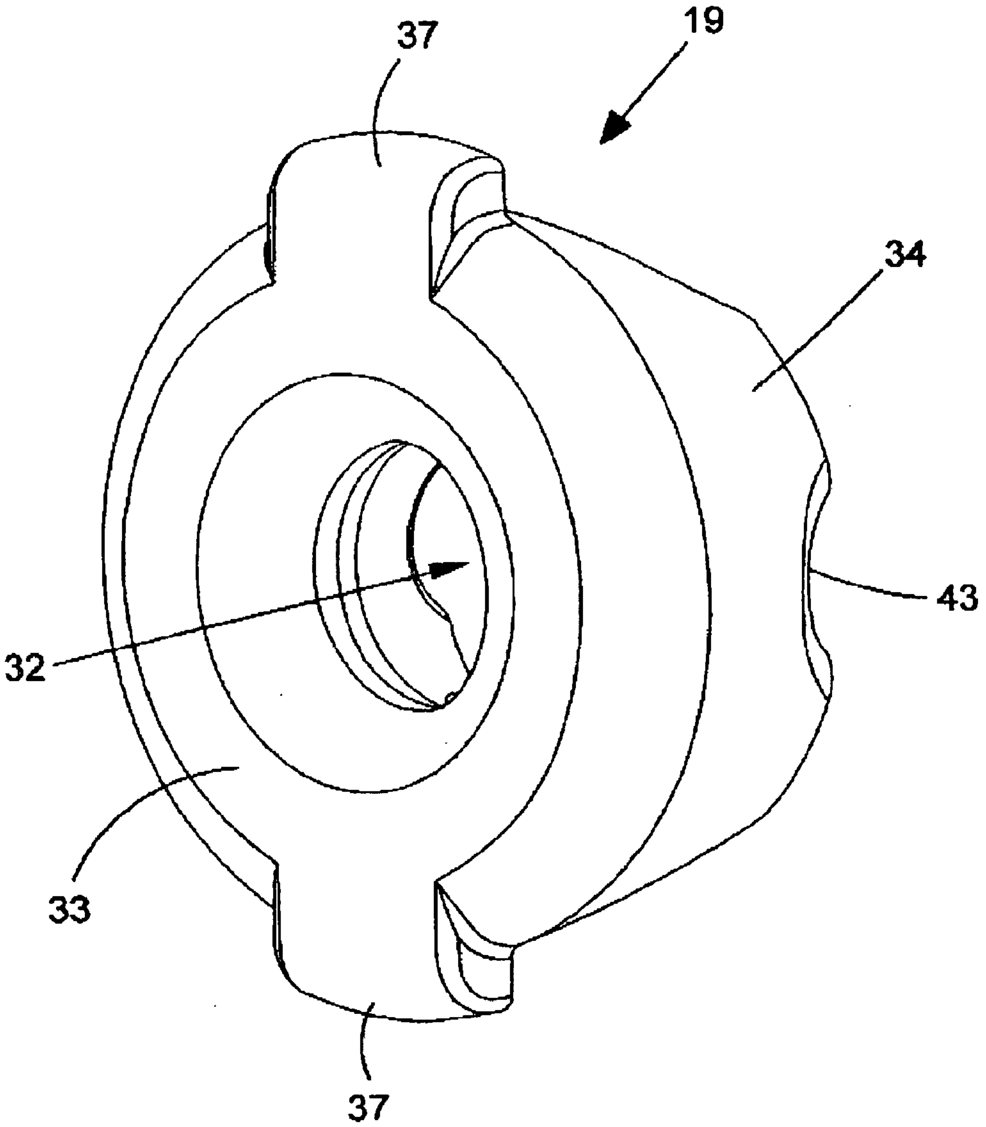
FIGS. 13 and 14 show a second resiliently deformable part of the stop assembly shown in FIGS. 6 to 8.
Figure 14:
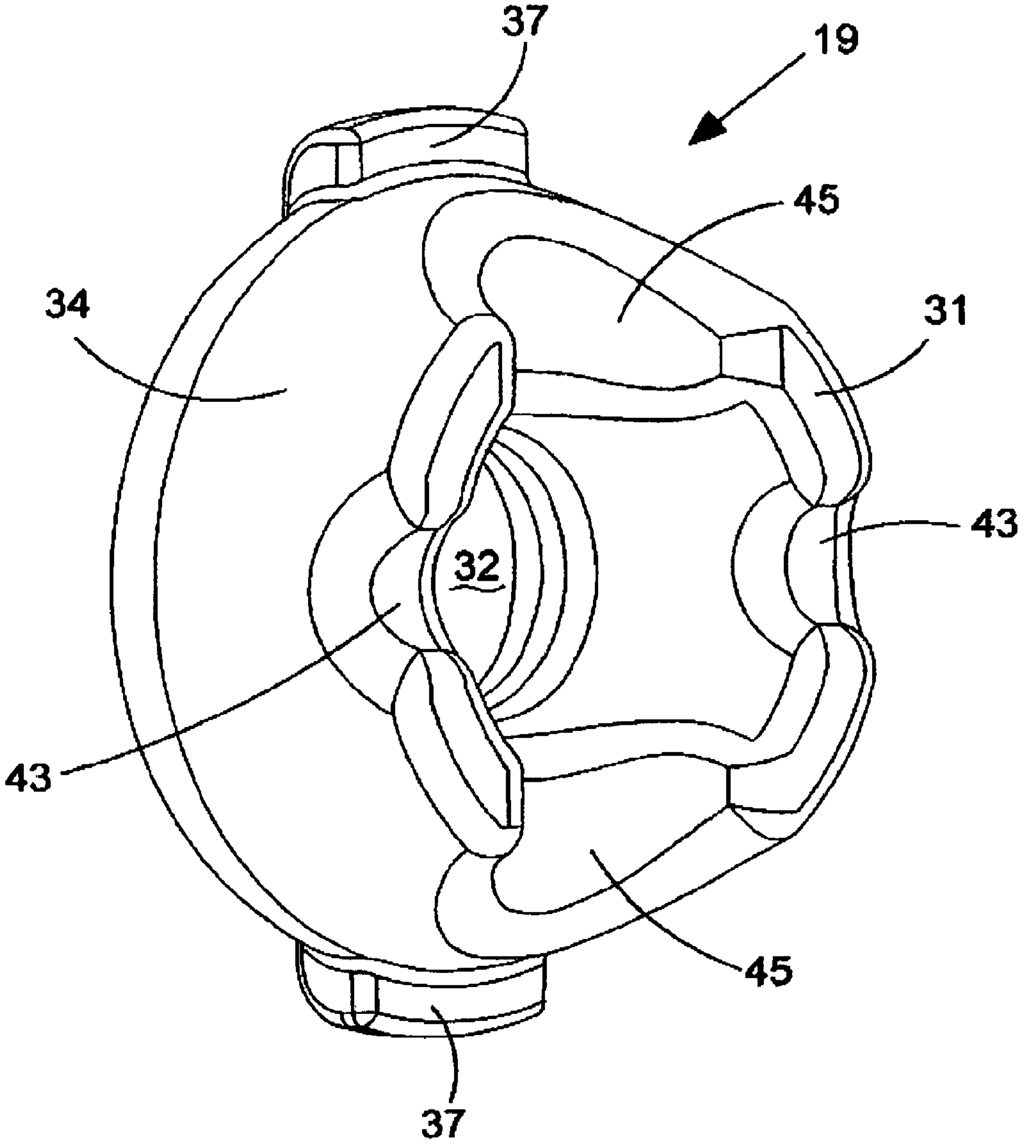

FIGS. 3 to 5 show the resilient stop assembly 9, and the driver 5, as shown in FIGS. 1 and 2. The stop assembly 9 includes a first resiliently deformable part 15, a second resiliently deformable part 19, and a substantially rigid part 17 situated between the deformable parts. The driver 5 has a front surface 21, from which the ram 7 extends in a forward direction through an aperture in each of the parts 15, 17, 19 of the resilient stop assembly 9. FIGS. 6 to 14 show the resilient stop assembly 9 and its various parts, in greater detail.

Each of the two resiliently deformable parts 15 and 19, and the substantially rigid part 17, include: first and second opposite impact surfaces, at least one peripheral surface joining the impact surfaces, and an aperture extending entirely through the part between exit openings in the impact surfaces. The first and second impact surfaces of the first resiliently deformable part 15 are labeled 23 and 25 respectively, and an aperture 24 extends entirely through the part 15 from an exit opening in the first impact surface 23 to an exit opening in the second impact surface 25. Two opposite peripheral surfaces 26*a* and two opposite peripheral surfaces 26*b* of the first resiliently deformable part 15 join the two impact surfaces 23 and 25.

The first and second impact surfaces of the second resiliently deformable part 19 are labeled 31 and 33 respectively and an aperture 32 extends entirely through the part 19 from an exit opening in the first impact surface 31 to an exit opening in the second impact surface 33. A peripheral surface 34 of the second resiliently deformable part 19 joins the two impact surfaces 23 and 25.

The first and second impact surfaces of the substantially rigid part 17 are labeled 27 and 29 respectively, and an aperture 28 extends entirely through the part 17 from an exit opening in the first impact surface 27 to an exit opening in the second impact surface 29. Two opposite peripheral surfaces 30*a* and two opposite peripheral surfaces 30*b* of the substantially rigid part 17 join the two impact surfaces 27 and 29. Each of the impact surfaces 27 and 29 of the substantially rigid part 17 includes ridges 14 to help seat the resiliently deformable parts thereon, and to hinder movement of the resiliently deformable parts across the impact surfaces 27 and 29. The substantially rigid part 17 is generally in the form of a disc. As shown in FIGS. 1 to 5, when the driver 5 contacts the resilient stop assembly 9 in use, the ram 7 of the driver extends through each of the apertures 24, 28 and 32, which apertures are in line with each other and with the ram, for this purpose.

The first impact surface 31 of the second resiliently deformable part is separated from the second impact surface 25 of the first resiliently deformable part by contact of those first and second impact surfaces with the substantially rigid part 17. As shown in FIGS. 1 and 2, the stop assembly 9 is arranged in the impact tool 1 such that when the driver 5 of the tool contacts the stop assembly, the driver's direct contact with the stop assembly is with the first impact surface 23 of the first resiliently deformable part 15. At least some of the kinetic energy of the driver 5 is then absorbed by the first resiliently deformable part 15, but any residual kinetic energy is transferred from the first resiliently deformable part 15 to the substantially rigid part 17, via the second impact surface 25 of the first resiliently deformable part and the first impact surface 27 of the substantially rigid part. The substantially rigid part 17 then transfers most (or substantially all) of the kinetic energy to the second resiliently deformable part 19, via the second impact surface 29 of the substantially rigid part and the first impact surface 31 of the second resiliently deformable part. The second resiliently deformable part 19 then preferably absorbs most or all of the remaining kinetic energy. The second impact surface 33 of the second resiliently deformable part 19 contacts a substantially rigid surface 35 of the main body 3 of the tool. The invention thus has the advantage that, by including first 15 and second 19 resiliently deformable parts separated by a substantially rigid part 17, the resilient stop assembly 9 can absorb at least some of the kinetic energy of the driver 5 in stages (via the impact surfaces of the various parts), with some of the energy absorbed by the first resiliently deformable part 15, and some of the energy absorbed by the second resiliently deformable part 19.

The resilient stop assembly 9 may be retained in place adjacent to the forwardly-located surface 35 of the main body of the impact tool 1, by any convenient means. For example, one or more features (e.g. protrusions and/or recesses) of one or more of the parts of the resilient stop assembly 9 may engage with one or more features (e.g. protrusions and/or recesses) of the main body 3 (e.g. a housing or frame) of the impact tool 1. In the illustrated embodiment, the second resiliently deformable part 19 includes a pair of such protrusions 37, which locate in corresponding recesses 39 in the main body 3. Additionally or alternatively, the first resiliently deformable part 15 may include one or more (e.g. two) such protrusions and/or recesses.

As can be seen from the figures, the first impact surface 23 of the first resiliently deformable part 15 is similar in cross-sectional shape and size to the front surface 21 of the driver. However, the cross-sectional area of the substantially rigid part 17, and in particular the second impact surface 29 of the substantially rigid part 17, is greater in area than the front surface 21 of the driver. This has the advantage that the substantially rigid part 17 of the stop assembly 9 spreads out (i.e. widens, or disperses) the force imparted by the driver 5 on the stop assembly. Thus, the substantially rigid part 17 effectively increases the surface area of the front surface of the driver (as far as the force experienced by the second resiliently deformable part 19 is concerned), thereby reducing the pressure applied to the second resiliently deformable part. This therefore enables the second resiliently deform able part 19 to absorb a greater amount of kinetic energy than would have been the case without the substantially rigid part 17.

Both the first and the second resiliently deformable parts 15 and 19 are shaped to minimize stresses and to maximize kinetic energy absorption (or dissipation), when the driver 5 impacts the resilient stop assembly 9. Thus, the peripheral surfaces 26*a* of the first resiliently deformable part 15 are each shaped such that they include a recess 41, and the peripheral surfaces 26*b* include a smooth curve that transitions into the first impact surface 23. The peripheral surface 34 of the second resiliently deformable part 19 includes two opposite pairs of recesses 43 and 45, and the peripheral surface flares outwardly in a direction from the first impact surface 31 to the second impact surface 33.

It will be understood that the above description and the drawings are of a particular example of the invention, but that other examples of the invention are included in the scope of the claims.

We claim:

1. A resilient stop assembly for an impact tool, comprising: first and second resiliently deformable parts, and a substantially rigid part situated, at least in use, between the resiliently deformable parts, each of the first and second resiliently deformable parts and the substantially rigid part comprising opposing first and second impact surfaces, at least one peripheral surface joining the first and second impact surfaces, and an aperture extending entirely therethrough between exit openings in the impact surfaces, wherein the first impact surface of the second resiliently deformable part is separated from the second impact surface of the first resiliently deformable part by contact of the first and second impact surfaces of the second and first resiliently deformable parts, respectively, with the substantially rigid part, wherein the second impact surface of the substantially rigid part is in contact with . the first impact surface of the second resiliently deformable part, and wherein the second impact surface of the substantially rigid part has a greater area than the first impact surface of the first resiliently deformable part, wherein at least a portion of the peripheral surfaces of at least one of the first and second resiliently deformable parts flares outwardly in a direction from the first impact surface to the second impact surface thereof wherein at least one of the first and second impact surfaces of the second resiliently deformable part is greater in area than at least one of the filet and second impact surfaces of the first resiliently deformable part.

2. The resilient stop assembly according to claim 1, wherein each of the first and second resiliently deformable parts and substantially rigid part comprises an undivided unitary body.

3. The resilient stop assembly according to claim 1, wherein at least one of the first and second impact surfaces of the substantially rigid part is greater in area than at least one of the first and second impact surfaces of the first resiliently defonnable part.

4. The resilient stop assembly according to claim 1, wherein the second impact surface of the second resiliently deformable part is greater in area than the first impact surface thereof.

5. The resilient stop assembly according to claim 1, wherein a thickness of the second resiliently deformable part between the first and second impact surfaces thereof is greater than a thickness of the first resiliently deformable part between the first and second impact surfaces thereof.

6. The resilient stop assembly according to claim 1, wherein the second resiliently deformable part has a greater volume than the first resiliently deformable part.

7. The resilient stop assembly according to claim 1, wherein the first and second resiliently deformable parts have at least one of different hardnesses and elasticities.

8. The resilient stop assembly according to claim 1, wherein the first and second resiliently deformable parts have different shapes.

9. The resilient stop assembly according to claim 1, wherein the substantially rigid part is substantially in the form of a sheet, plate or disc, with the first and second impact surfaces forming major surfaces thereof.

10. A resilient stop assembly for an impact tool, comprising:

first and second resiliently deformable parts, and a substantially rigid part situated, at least in use, between the resiliently deformable parts, each of the first and second resiliently deformable parts and the substantially rigid part comprising opposing first and second impact surfaces, at least one peripheral surface joining the first and second impact surfaces, and an aperture extending entirely therethrough between exit openings in the impact surfaces, wherein the first impact surface of the second resiliently deformable part is separated from the second impact surface of the first resiliently deformable part by contact of the first and second impact Surfaces of the second and first resiliently deformable parts, respectively, with the substantially rigid part, and at least one of the first and second impact surfaces of the second resiliently deformable part being greater in area than at least one of the first and second impact surfaces of the first resiliently deformable part.

11. A resilient stop assembly for an impact tool, comprising:

first and second resiliently deformable parts, and a substantially rigid part situated, at least in use, between the resiliently deformable parts, each of the first and second resiliently deformable parts and the substantially rigid part comprising opposing first and second impact surfaces, at least one peripheral surface joining the first and second impact surfaces and an aperture extending entirely therethrough between exit openings in the impact surfaces, wherein the first impact surface of the second resiliently deformable part is separated from the second impact surface of the first resiliently deformable part by contact of the first and second impact surfaces of the second and first resiliently deformable parts, respectively, with the substantially rigid part, and the second impact surface of the second resiliently deformable part being greater in area than the first impact surface thereof.

* * * * *